May 17, 1960 E. C. HERRICK 2,937,176
PREPARATION OF DIAZABICYCLO-OCTANE
Filed Dec. 17, 1956
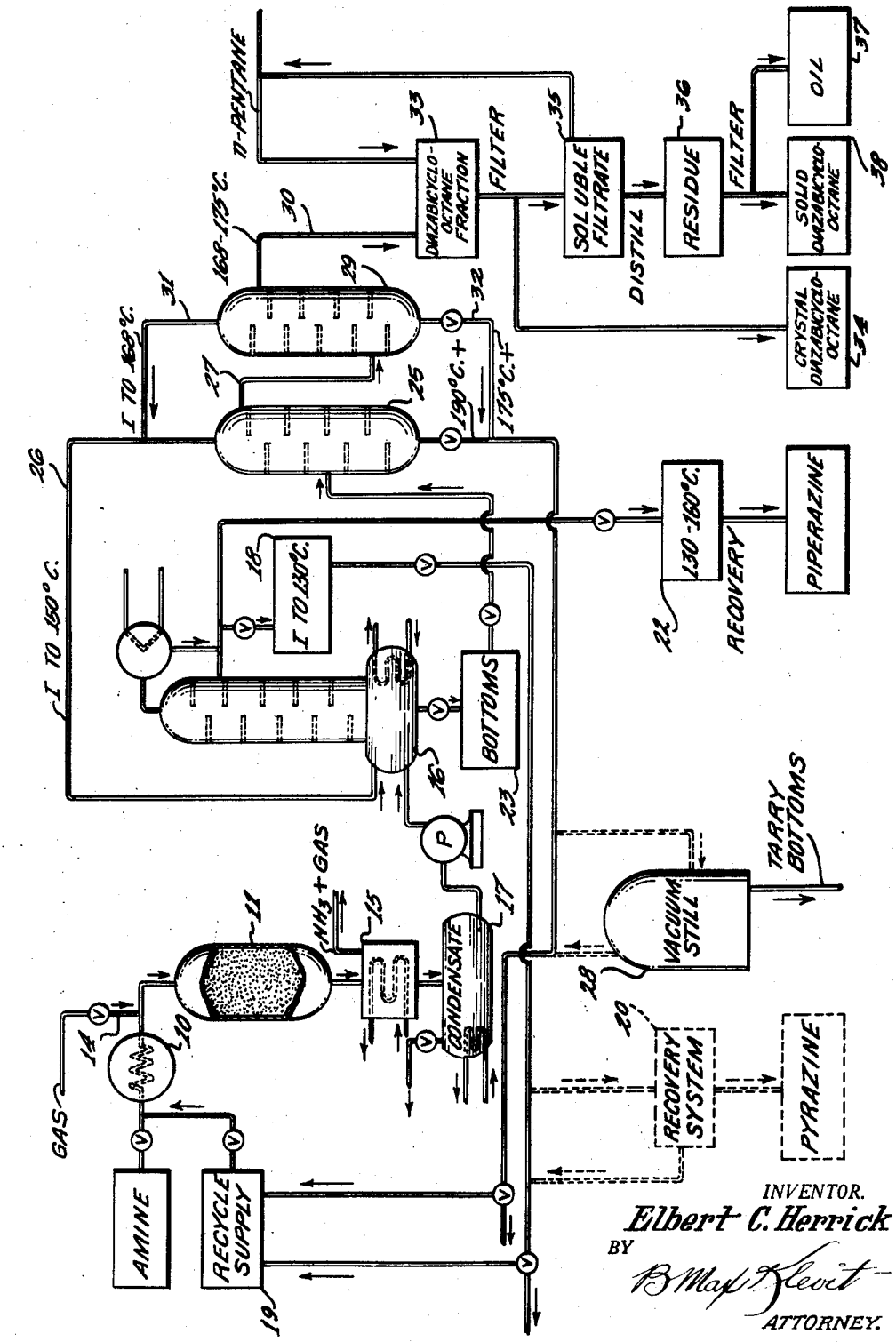
INVENTOR.
*Elbert C. Herrick*
BY
*B. Max Klevit*
ATTORNEY.

UNITED STATES PATENT OFFICE 2,937,176
Patented May 17, 1960

2,937,176

PREPARATION OF DIAZABICYCLO-OCTANE

Elbert C. Herrick, Media, Pa., assignor to Houdry Process Corporation, Wilmington, Del., a corporation of Delaware Application December 17, 1956, Serial No. 628,723

12 Claims. (Cl. 260—268)

The present invention relates to the preparation of 1,4-diazabicyclo-(2.2.2)-octane, also known as triethylene diamine, in comparatively high yields and to the improved recovery of the same from reaction mixtures as a product of acceptable purity.

Diazabicyclo-octane is best known in the literature as a reaction product of N-2-bromoethyl piperazine hydrobromide. Because of the insufficient availability of this starting material, this route does not provide an attractive commercial source for preparation of diazabicyclo-octane. While the preparation of bicyclo diamines of this type has been long sought by organic chemists and many different methods are suggested in the literature for preparation of such compounds, some of which utilize alkyl, alkylol, or other substituted aliphatic amines as starting materials, the product was obtained in only poor yields in the order of up to about 2% of theory, or on a product presumed to be diazabicyclo-octane, later identification showed the recovered product to be other than the bicyclo diamine sought.

Later work on the attempted preparation of diazabicyclo-octane includes that of Hromatka (Berichte der Deutschen Chemischen Ges. 1942), who investigated the effect of temperature in heating diethanolamine hydrochloride in the 200–260° C. range. The best results by Hromatka reported 2% diazabicyclo-octane obtained by 18 hours heating of the diethanolamine hydrochloride at 220° C. At the higher temperatures tried, sudden dissociation was noted and failure to recover diazabicyclo-octane from the reaction products. Other syntheses carried out by Hromatka, e.g. in attempting to prepare diazabicyclo-octane by heating triethanolamine with ammonium chloride and by reaction of ethanolamine hydrochloride with diethanolamine, produced no better yields. Isolation of minute amounts of diazabicyclo-octane from the reaction mixture was effected by separation of its perchlorate from the more soluble perchlorate of the accompanying morpholine.

More recent work (Ishiguro et al., Journal Pharmaceutical Society, Japan, 1955), reports successful preparation of diazabicyclo-octane from N-haloalkyl derivatives of piperazine hydrohalides over silica-alumina.

The presence of small amounts of diazabicyclo-octane has also been reported in reaction products obtained in the synthesis of piperazine from various alkyl and alkylol amines.

Among the objects of the present invention are the production of diazabicyclo-octane from readily available raw materials by relatively simple and efficient methods warranting commercial adoption.

The structure of diazabicyclo-octane, sometimes referred to as triethylene diamine, has been confirmed as being 1,4-diazabicyclo-(2.2.2)-octane, having the formula:

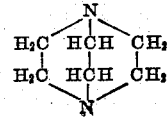

The purified base, recovered from the p-nitrophenolate is hygroscopic, melts at 158–160° C., and is shown to have a molecular weight of 112 by the Rast camphor method. The presence of 2 basic nitrogen atoms is accounted for by titration. It is a weaker base than piperazine, being weakly basic to phenolphthalein and basic to methyl red. The perchlorate salt of the base is appreciably soluble in cold water and dissociate explosively without melting at 300° C.

Because of the unavailability of diazabicyclo-octane in sufficient quantities, many of its possible commercial uses evidenced by its physical and chemical properties have not been fully investigated. The base readily forms the dipicrate salt which is a sensitive explosive. Being a relatively strong nitrogen base, it forms quaternary N-salts having cationic activity useful as detergents, dispersants, and other surface active agents. The base and its acid salts, including the tartarate, phosphate, and acetate, should be useful, as are the corresponding piperazine salts, as effective vermifuges for poultry and swine, being used as such in direct medication or as a component (0.1 to 3%), of animal feeds.

In accordance with the invention, diazabicyclo-(2.2.2)-octane is prepared by the vapor phase reaction of an aliphatic amine, such as an alkylene polyamine or alkanol amine, over acidic solid catalyst in a temperature range of 300 to 500° C. obtaining this compound with accompanying production of piperazine. The reaction product is fractionated by distillation and diazabicyclo-octane is recovered in a fraction boiling above piperazine and is purified by several methods, e.g. by treatment of such fraction with low boiling liquid hydrocarbon.

The preferred method of operation is illustrated in the accompanying flow diagram. Pumps, heat exchangers, scrubbers, storage vessels, and other conventional auxiliary equipment have been omitted in most instances for sake of clarity. As shown, the starting aliphatic amine is initially vaporized and heated to reaction temperature in a salt bath or other temperature-controlled heater at 10 and passed in vapor form into a fixed bed catalytic reactor at 11. Hydrogen or inert gas, such as nitrogen, may be introduced at 14 for initial pressurizing (if desired) and preheating of the reactor 11, and if needed, for pressure and temperature adjustment during the reaction.

In the illustrative example, hereinafter described in detail, diethylene triamine was employed as the starting material. Other alkyl or alkylol amines can be used instead, and under substantially the same operating conditions, including ethylene diamine, triethylene tetramine, isopropanol-amine, 1,2-diamino propan, N-2-hydroxyethyl ethylene diamine (beta aminoethyl-ethanolamine), and in general those alkylene polyamines and their hydroxyalkyl derivatives corresponding to the formula:

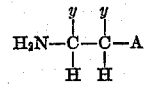

A is $NH_2$, OH, or an

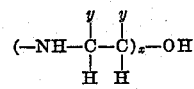

or

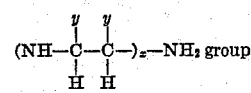

$x$ being an integer from 1 to 4, and $y$ is hydrogen or $CH_3$.

The preferred catalyst is silica-alumina, particularly of the type familiarly used in catalytic cracking of hydrocarbons, in the form of granules, molded pellets, or beads. Such catalysts include the synthetic dried gel type catalyst formed by suitable impregnation of silica gel, or by co-precipitation of alkali metal silicate with an aluminum compound, to provide a gel comprising 60–90% by weight $SiO_2$ to 40–10% by weight $Al_2O_3$ and which may include therein other refractory metal oxides such as magnesia or zirconia. Other known silica-alumina catalysts that may be employed include acid-activated clays of the montmorillonite and kaolin types. Catalysts containing a minor quantity of a dehydrogenating metal component, such as 0.5 to 3% nickel, supported on the silica-alumina carrier, may also be used.

The desired diazabicyclo-octane product, as well as piperazine, is formed over a reaction temperature range of from about 300 to 500° C., higher temperatures in the range, as from about 330° C. favoring higher over-all yields of diazabicyclo-octane and higher proportionate yields of diazabicyclo-octane to piperazine. Thus, as reaction temperature is increased over the range from 330° C. to about 360° C. almost a threefold increase in diazabicyclo-octane yield is obtained. At temperatures above about 430° C. at the practical throughput rates used, additional side reaction products are formed with increasing difficulties of separation. Accordingly, the preferred temperature range at space rates of 0.5 to 2.0 volumes of alkyl amine per hour per volume of catalyst is at about 330–430° C.

The use of elevated pressure is not essential to the operation. In general, pressures from atmospheric to 100 pounds per square inch may be used. In some instances, particularly when operating at super-atmospheric pressure, it may be desirable to reduce the partial pressure of the amines in the reaction zone, which may be accomplished by the addition of gaseous diluent, such as hydrogen or inert gas, in quantities of up to 10 mols per mol of amine charged. When the catalyst employed is one containing a hydrogenating metal component, the addition of at least several mols of hydrogen to the reaction zone is particularly recommended.

Referring again to the flow sheet, the vapor effluent from reactor 11 is cooled and reduced to atmospheric pressure as shown at 15 to separate ammonia formed in the process and other gases from liquid products and unconverted amines, the ammonia being absorbed in water and separated from the other gases. The remaining liquid condensate is sent to a batch still as shown at 16 for separation into desired fractions. Continuous distillation apparatus, it will be understood, may be employed at this point and elsewhere in the system instead of the batch stills described. For batch operation the condensate from 15 is collected as indicated at 17 to provide sufficient charge for distillation. The various fractions, specifically shown as separated in the accompanying flow diagram, are based on an operation utilizing diethylene triamine as the fresh charge. It will be understood that with other starting alkylene or alkylol amines the handling of the various cuts and the cut points will be appropriately modified. In any event, initial distillation at 16 is operated to provide at least, (1) a fraction boiling below piperazine which will include pyrazine and its simple homologues as well as ethylene diamine and other possible alkyl amines within this boiling range from dissociation of diethylene triamine, (2) a fraction boiling in the approximate range of piperazine and which may include some simple homologues of piperazine formed in the process, such as methyl piperazine, and (3) a fraction boiling above piperazine which will include diazabicyclo-octane as well as diethylene triamine and other aliphatic amines falling in this boiling range.

Assuming that diethylene triamine is employed as the fresh feed, distillation is effected to collect an initial fraction indicated at 18 to a cut point of 125° or up to 130° C., operating the still at a reflux ratio of 10/1 to about 15/1. The distillate collected at 18 may be sent at least in part to recycle supply as shown at 19, with previous recovery of pyrazine therefrom if desired, as optionally indicated in dotted lines at 20.

The piperazine-containing fraction is then collected as indicated at 22 which may be a cut boiling up to 150° or 160° C., from which piperazine can be separated and recovered in any desired manner. While not presently advocated in view of the existing demand for piperazine on the commercial market, all or part of the piperazine fraction may be treated, if desired, to convert the same to diazabicyclo-octane; for instance by recycling the same to the principal reaction at 11.

When the piperazine fraction of the desired boiling range has been collected, the still bottoms will be collected as shown at 23, for further treatment. It should be noted that diazabicyclo-octane is highly volatile so that a small part thereof will distill below the expected boiling point and will be found in the distillates, from which a portion of the diazabicyclo-octane may be recovered, if desired, in the separation of other accompanying products.

The collected still bottoms from 23, depending upon the temperature of the final distillate cut, will be a fraction boiling above 150° or above 160° C. The bottoms fraction is stripped as indicated at 25 to separate out any lower boiling material remaining therein. For instance, an overhead fraction of up to 150° C. may be initially boiled off as indicated at 26 and returned to still 16 for recovery of any piperazine or other desired products that may be present. The fraction boiling above 150° C. and up to about 190° C., obtained as a heart cut at 27 contains the major portion of the diazabicyclo-octane. The bottoms fraction boiling above 190° C. which will contain chiefly unreacted diethylene triamine and other aliphatic amines, is returned to recycle supply at 19. If desired, the recycle material may be purified to remove tars and high boiling polymers as optionally indicated at 28, to avoid contamination of the catalyst thereby.

The 150–190° C. fraction is then further distilled as indicated at 29 to obtain a narrower cut containing the desired diazabicyclo-octane fraction. Accordingly, there is collected a fraction boiling, say, in the range of 168 to 175° C. as shown at 30, lower boiling materials being first driven off at 31 and returned to the first still 16, separately or together with the fraction from still 25, and the bottoms boiling above 175° C. being withdrawn at 32 and sent to recycle supply 19, in whole or part, this fraction containing the major portion of the diethylene thiamine and any other aliphatic or cyclic amines boiling in this range, suitable as charge material for further production of diazabicyclo-octane. The recycle may be purified by vacuum distillation as at 28.

The collected recycled products from 19 are supplied to the reactor 11 together with fresh alkylene amine in the desired ratio depending upon the nature of the fresh charge selected, the depth of conversion, the efficiency of the separation effected by the fractionation equipment employed, and the economics of the system. Good yields of diazabicyclo-octane have been obtained from fresh diethylene triamine without recycling any products as well as in operations wherein approximately equal parts of fresh and recycle products were charged and those in which the charge contained no fresh diethylene triamine or other alkylene amine.

The cooled diazabicyclo-octane fraction at 33 comprises a mixture of crystalline and liquid products. It is purified, as indicated, by trituration one or more times with at least an equal volume of n-pentane and preferably by 2 or 3 successive treatments with fresh n-pentane. Cooling and filtration yields (34) a white crystalline solid of fairly pure diazabicyclo-octane (95+%). The light solvent plus pentane soluble component 35 is distilled to recover n-pentane solvent. The remaining mushy liquid and crystalline product (36) are separated by filtration, giving a dark colored oily residue 37 containing about 26% diazabicyclo-octane and a light colored crystalline product (38) containing 88 or more percent diazabicyclo-octane. This product can be further purified by retreatment with hydrocarbon as at 33 or in the manner described below.

While in the above-described operation several fractional distillation steps were employed to obtain a diazabicyclo-octane concentrate to be treated with pentane, it will be understood that less precise fractionation may be employed and that a wider cut of still bottoms at lower diazabicyclo-octane concentration can be treated to recover the diazabicyclo-octane content. For example, the total still bottoms from 23 can be treated directly with 2 to 3 volumes n-pentane or other light liquid hydrocarbon, the separation and recovery of products, however, will not be as clean as when the described multiple distillation is followed.

While pentane is the preferred solvent for purification of diazabicyclo-octane, other normally liquid low boiling aliphatic hydrocarbons can be used including straight and branched chain hydrocarbons and mixtures of these, boiling in the range of up to about 130° C. Hydrocarbons boiling above about 130° C., while operable, are more difficult to separate. When using $C_4$ compounds for this purpose, it may be necessary to adjust temperature and/or pressure to maintain the solvent in liquid state and avoid excessive losses by vaporization. The hydrocarbon liquid should preferably be employed in amounts of about 3 to 6 volumes of hydrocarbon per volume of diazabicyclo-octane fraction of about 50% or greater diazabicyclo-octane content. Instead of the hydrocarbon liquid alone, the diazabicyclo-octane fraction at 33 may be treated first with more polar solvents such as acetone, but no particular advantage has been found for this step.

The initial crystalline material recovered at 34 is sufficiently pure (95+%) for most uses of the product. If a product of higher grade of purity is desired, this material may be further purified by sublimation (obtaining a product of 99.9+% purity), recrystallization of the base as such, or by conversion to water-soluble salts such as the acetate or nitro-phenolates and crystallization. Alternatively, diazabicyclo-octane of high purity can be recovered directly by sublimation of the distillate cut 30, however, the yields are considerably less than those obtained in the preferred hydrocarbon extraction procedure.

While the oily portion 37 does contain some diazabicyclo-octane, in the order of about 25%, recovery of the diazabicyclo-octane therefrom is considerably more difficult, and unless it is desired to recover certain of the other valuable products contained therein, is not believed economically feasible.

The following examples illustrate application of the described process for production and recovery of diazabicyclo-octane and piperazine as principal products.

*Example I*

Several separate runs were made in which a charge consisting of commerical diethylene triamine was preheated to reaction temperature and passed over 4 mm. pellets of synthetic silica-alumina catalyst comprising 86% $SiO_2$ and 12% $Al_2O_3$ by weight, and of 34 activity index (as determined by the CAT-A method; see J. Alexander and H. G. Shimp, page R-537, National Petroleum News, August 2, 1944). The reaction conditions included temperature of 675° F., space rate of 1.2 volumes of charge per volume of catalyst, at substantially atmospheric pressure. The reactor effluent was condensed with removal of ammonia. Liquid recovery was of the order of 90% by weight of charge, which exclusive of unreacted diethylene triamine was composed chiefly of the products reported in Table I below.

The liquid effluent from the several runs was distilled in a Podbielnak column of 20 plate efficiency at a reflux ratio of 10/1, obtaining the following cuts:

| | Wt. percent of charge |
|---|---|
| Initial to 130° C. | 11.4 |
| 130–143° C. | 3.0 |
| 143–153° C. | 2.7 |
| 153–160° C. | 0.8 |
| 160–bottoms | 82.1 |

*Example II*

Several separate runs were made under the same conditions as above, recycling the initial to 130° C. fraction and the 160–bottoms fraction in the ratio of 3 parts fresh diethylene triamine to 1 of recycle. Analysis of the liquid product from one such run, exclusive of unreacted diethylene triamine, is reported in Table I below.

*Example III*

A preheated charge consisting of 30% fresh diethylene triamine and 70% recycled products from previous operation was passed over pelleted silica-alumina catalyst of the same composition as that employed in the previous example but having an activity index (by the CAT-A method), of 46. The operating conditions were: 575° F. 0.6 volume space rate and 60 pounds per square inch gauge pressure. The analysis of the liquid effluent exclusive of unreacted diethylene triamine is given in Table I.

The reaction effluent was condensed to separate ammonia, and the liquid effluent charged to a batch still comprising a packed column with the equivalent of 20 theoretical plates, together with collected effluent from other runs. The collected fractions were distributed as follows:

| | Wt. percent of charge |
|---|---|
| Initial to 130° C. | 12.9 |
| 130–143° C. | 3.1 |
| 143–153° C. | 3.1 |
| 153–160° C. | 1.9 |
| 160–bottoms | 79.8 |

Table I below shows the product distribution of the several runs described in the above examples:

TABLE I

| | Vol. Percent of Reactor Liquid Effluent | | | |
|---|---|---|---|---|
| | Example 1 | | Example 2 | Example 3 |
| | Run 1 | Run 2 | | |
| Piperazine | 12.2 | 10.5 | 12.4 | 7.1 |
| Alkyl Piperazines | 6.8 | 8.0 | 8.0 | 6.5 |
| Pyrazine and Homologues | 5.4 | 5.4 | 3.1 | 3.6 |
| Diazabicyclo-octane | 9.4 | 10.0 | 10.1 | 5.1 |
| Ethylene Diamine and Homologues | 7.4 | 8.9 | 10.1 | 8.9 |

The combined 130–160° C. fractions from the above and other runs were collected for recovery of piperazine. The lower boiling (to 130° C.), materials and bottoms fractions were likewise collected and the major portion utilized as recycle charge in other runs made in various ratios of recycle to fresh feed, including several runs with only recycle being charged. A minor portion of the collected still bottoms was further distilled to separate out a cut boiling in the range 302 to 375° F. (circa 150–190° C.), and containing approximately 45 to 50% by weight of diazabicyclo-octane. Of this fraction, 3928 parts by weight were charged to a Podbielniak column of 20 theoretical plates at a reflux ratio of 20:1, collecting a cut boiling in the range 168–175° C. comprising about 36.4% by weight of the still charge; this cut on cooling formed a soft solid mass and contained about 60–65% diazabicyclo-octane. To 1300 parts by weight of this solid mass was added approximately 800 parts by weight acetone (about 1 liter acetone per 1.3 kg. solid), and the mixture agitated and filtered to separate the wash liquid from undissolved solids. The solids portion was then treated twice with 1700 parts by weight n-pentane (about 1 liter n-pentane per kg. original solid in each treat), agitated and filtered to remove the wash liquid, thereby obtaining 480 parts by weight of crystalline solid composed of diazabicyclo-octane of 95% purity. A portion of the crystalline material was further purified by sublimation obtaining a product of above 98% purity.

The two wash liquids were combined and distilled to take off acetone and pentane, leaving behind a wet solid mass, which was filtered, obtaining 412 parts by weight of dry solid analyzing 88% diazabicyclo-octane and 400 parts by weight of an oily liquid analyzing 26% diazabicyclo-octane.

Another sample of the 302–375° F. fraction of collected still bottoms (circa 150–190° C.), was further distilled in a column having the equivalent of 80 theoretical trays, collecting the fraction boiling over the range 172–174° C.

(a) One portion of the 172–174° C. fraction above obtained (various cuts of which analyzed respectively 76 to 89% diazabicyclo-octane), was rerun through an 80 plate column, this time collecting the fraction boiling 173–173.5° C. (analyzing 90% diazabicyclo-octane). The obtained fraction was washed in ether and recrystallized from methyl ethyl ketone solution, then the crystals further purified by sublimation obtaining diazabicyclo-octane of 99%+ purity.

(b) Another portion of the 172–174° C. fraction was recrystallized 3 times from acetone, obtaining diazabicyclo-octane of 99%+ purity.

The 99%+ pure diazabicyclo-octane obtained as above described, melted at 158–160° C. and boiled at 174–176° C. (S.T.P.). On ultimate analysis it showed the presence of the theoretical N content, and mass spectra identification showed a molal weight of 112. Titrating of the product in a 1/1 ethanol-water solution with a standard calomel electrode gives a pK₂ value of 8.6 and initial pH of 10.9 in 1:1 acetone-water solution, indicating a strongly basic tertiary amine structure, which was further confirmed by absence of reaction with benzene sulfonyl chloride at ordinary temperatures.

In addition to the suggested uses for diazabicyclo-octane given above and those evident from its reported physical and chemical properties, it has been found that diazabicyclo-octane has a strong diuretic action comparable with hexamethylene tetramine.

The feature of recovering diazabicyclo-octane from reaction mixtures containing the same is not limited in its applicability to reaction mixtures derived from catalytic vapor phase conversion of aliphatic amines. It will be understood that the described recovery operation can also be used in obtaining diazabicyclo-octane from reaction mixtures containing the same as a by-product of piperazine manufacture by other known vapor phase as well as liquid phase conversion of such amines. The pentane purification technique finds particular advantage as applied to fractions of reaction mixtures boiling above piperazine and containing an appreciable content of diazabicyclo-octane in the order of about 10% or more.

Obviously many modifications and variations of the invention as hereinbefore set forth may be made without departing from the spirit and scope thereof and therefore only such limitations should be imposed as are indicated in the appended claims.

What is claimed is:

1. The method of preparing diazabicyclo-(2·2·2)-octane which comprises passing an alkylene polyamine having from 2 to 10 carbon atoms in vapor phase over active solid siliceous cracking catalysts at a temperature in the range of 300 to 500° C., separating from the reaction product a fraction boiling above piperazine, and recovering the said diazabicyclo-octane from said fraction, said alkylene polyamine being one in which the amino groups are separated by 2 carbon atoms.

2. The method according to claim 1 wherein said alkylene polyamine is ethylene diamine.

3. The method according to claim 1 wherein said alkylene polyamine is diethylene triamine.

4. The method according to claim 1 wherein said catalyst comprises silica-alumina.

5. The method according to claim 1 wherein said catalyst is pelleted synthetic silica-alumina comprising 60 to 90% by weight SiO₂ and 40 to 10% by weight Al₂O₃.

6. The method according to claim 1 wherein said temperature lies in the range of 330–430° C.

7. The method of preparing diazabicyclo-(2·2·2)-octane which comprises passing an aliphatic amine in vapor phase over an active silica-alumina cracking catalyst at a temperature in the range of 300 to 500° C., said aliphatic amine being a compound corresponding to the formula:

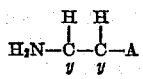

wherein A is a substituent selected from the group consisting of: NH₂, OH

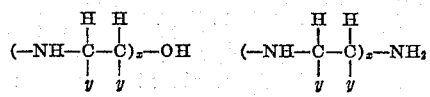

x being an integer from 1 to 4, and y is selected from the group consisting of H and CH₃; recovering from the reaction effluent a condensed liquid freed of normally gaseous products, fractionally distilling said liquid to provide at least three fractions including a first fraction boiling below piperazine, a second fraction in the approximate boiling range of piperazine, and a third fraction higher boiling than piperazine; recycling at least part of said first fraction to further contact with acidic solid siliceous catalyst; further distilling said third fraction and collecting therefrom a narrower cut fraction boiling within the range of 150 to 190° C., triturating at least part of said narrower cut fraction including products therein boiling within the range 168–175° C. with a normally liquid low boiling aliphatic hydrocarbon, and separating solid diazabicyclo-octane from the triturated material.

8. The method according to claim 7 wherein in the distillation of the said third fraction at least part of the bottoms boiling above 175° C. is recycled to further contact with active silica-alumina cracking catalyst.

9. The method according to claim 7 wherein materials boiling in the approximate range of pyrazine are removed from the first fraction prior to such further contact with catalyst.

10. The method according to claim 7 wherein said triturated narrower cut fraction from which solid diazabicyclo-octane has been separated, is further distilled to recover aliphatic hydrocarbon recycled to trituration and further quantities of solid diazabicyclo-octane are recovered from the residue of said last-mentioned distillation.

11. The method of preparing diazabicyclo-(2·2·2)-octane which comprises contacting an aliphatic amine charge comprising diethylene triamine with acidic silica-alumina catalyst at a temperature in the range of 330 to 430° C., condensing the reaction effluent to remove normally gaseous products therefrom, distilling the liquid condensate to obtain at least three fractions therefrom including: a first fraction boiling up to about 125–130° C., a second fraction boiling above said first fraction and up to about 150–160° C., and third fraction comprising distillation residue boiling above said second fraction; distilling said third fraction to separate therefrom a cut boiling within the range of about 150 to 190° C., separating from at least part of said cut a fraction boiling roughly in the range of diazabicyclo-(2·2·2)-octane, and recovering solid diazabicyclo-octane from said last-named fraction by treatment thereof with a liquid aliphatic hydrocarbon boiling up to about 130° C.

12. The method according to claim 11 wherein said aliphatic hydrocarbon is n-pentane.

References Cited in the file of this patent

UNITED STATES PATENTS

| | | |
|---|---|---|
| 2,454,404 | Pfann et al. | Nov. 23, 1948 |
| 2,467,205 | Gresham et al. | Apr. 12, 1949 |

UNITED STATES PATENT OFFICE

CERTIFICATE OF CORRECTION

Patent No. 2,937,176                          May 17, 1960

Elbert C. Herrick

It is hereby certified that error appears in the printed specification of the above numbered patent requiring correction and that the said Letters Patent should read as corrected below.

Column 4, line 50, for "thiamine" read -- triamine --; column 6, line 2, for "Podbielnak" read -- Podbielniak --; line 27, for "575° F." read -- 575° F., --.

Signed and sealed this 4th day of April 1961.

(SEAL)
Attest: ERNEST W. SWIDER

XXXXXXXXXX
Attesting Officer

ARTHUR W. CROCKER
Acting Commissioner of Patents